(12) United States Patent  (10) Patent No.: US 9,307,118 B2
Ono  (45) Date of Patent: Apr. 5, 2016

(54) METHOD, APPARATUS, AND PROGRAM FOR GENERATING COLOR CONVERSION LOOKUP TABLE

(71) Applicant: SEIKO EPSON CORPORATION, Tokyo (JP)

(72) Inventor: Satoru Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/606,898

(22) Filed: Jan. 27, 2015

(65) Prior Publication Data

US 2015/0213343 A1  Jul. 30, 2015

(30) Foreign Application Priority Data

Jan. 30, 2014  (JP) .................................. 2014-015349

(51) Int. Cl.
*G06K 15/02* (2006.01)
*H04N 1/60* (2006.01)
*H04N 1/46* (2006.01)

(52) U.S. Cl.
CPC . *H04N 1/46* (2013.01); *H04N 1/603* (2013.01)

(58) Field of Classification Search
USPC ............ 358/1.9, 518, 529, 530; 382/162, 167
See application file for complete search history.

(56) References Cited

U.S. PATENT DOCUMENTS

| 7,589,864 | B2 | 9/2009 | Teraue |
| 7,605,943 | B2 | 10/2009 | Berns et al. |
| 7,652,789 | B2 | 1/2010 | Berns et al. |
| 7,821,659 | B2 | 10/2010 | Kodama et al. |
| 7,961,352 | B2 | 6/2011 | Kaneko et al. |
| 8,520,253 | B2 * | 8/2013 | Ernst ...................... G06K 15/02 358/1.2 |
| 2011/0116116 | A1 * | 5/2011 | Hirano ................. H04N 1/6033 358/1.9 |

FOREIGN PATENT DOCUMENTS

| JP | 10-248017 | 9/1998 |
| JP | 2005-223695 | 8/2005 |
| JP | 2005-278074 | 10/2005 |
| JP | 2007-511175 | 4/2007 |
| JP | 2007-516663 | 6/2007 |
| JP | 2008-230047 | 10/2008 |
| JP | 2008-263579 | 10/2008 |

* cited by examiner

*Primary Examiner* — Quang N Vo
(74) *Attorney, Agent, or Firm* — Workman Nydegger

(57) ABSTRACT

A color conversion lookup table generation method includes the processes of (i) acquiring a set of parameter values which represents a specific color; (ii) acquiring a plurality of ink value set candidates which corresponds to the set of parameter values, and evaluated values each associated with a result of printing based on a corresponding one of the plurality of ink amount set candidates; (iii) allowing a user to input a preference characteristic of the user; and (iv) applying a color conversion lookup table which converts the set of parameters into a set of ink amounts which is determined on the basis the preference characteristic and the evaluated values.

5 Claims, 7 Drawing Sheets

METHOD, APPARATUS, AND PROGRAM FOR GENERATING COLOR CONVERSION LOOKUP TABLE

BACKGROUND

1. Technical Field

The present invention relates to a technology for generating a color conversion lookup table.

2. Related Art

Color printing apparatuses each for use as an output apparatus for outputting images have been in widespread use. A driver program for driving such a color printing apparatus operates while referring to a color conversion lookup table for use in converting a color specified in a color space by application software into an ink amount set which is a combination of a plurality of ink amounts each associated with a corresponding one of inks usable by the color printing apparatus. Heretofore, the combination of ink amounts contained in such a color conversion lookup table has been determined by a designer (for example, refer to JP-A-2008-230047).

In such a case, unfortunately, a case where a combination of ink amounts which is determined by a designer is not matched with a combination of ink amounts which is preferred by a user has sometimes occurred. In particular, a case where such a mismatch remarkably appears with respect to a combination of ink amounts corresponding to a specific color, such as red, green, or blue, has been likely to occur. For this reason, a technology for generating a color conversion lookup table which outputs a combination of ink amounts which is matched with the preference of a user has been desired. In addition thereto, with respect to existing printing apparatuses, downsizing, a cost reduction, a resource saving, facilitation of manufacturing, an improvement of usability, and the like, have been desired.

JP-A-2008-230047, JP-T-2007-516663, JP-A-10-248017, JP-A-2005-223695, and JP-A-2005-278074 are examples of related art.

SUMMARY

An advantage of some aspect of the invention is that a method, an apparatus, and a program for generating a color conversion lookup table are provided which enable generation of a color conversion lookup table which outputs a combination of ink amounts which is matched with a preference of a user.

(1) According to a first aspect of the invention, a color conversion lookup table generation method for generating a color conversion lookup table for use in converting a specific color specified in a color space into a set of ink amounts which is a combination of a plurality of ink amounts each associated with a corresponding one of inks usable by a printing apparatus is provided. This color conversion lookup table generation method includes the processes of (i) acquiring a set of parameter values which represents the specific color; (ii) acquiring a plurality of ink value set candidates which corresponds to the set of parameter values, and evaluated values each associated with a result of printing based on a corresponding one of the plurality of ink amount set candidates; (iii) allowing a user to input a preference characteristic of the user; and (iv) applying a color conversion lookup table which converts the set of parameters into a set of ink amounts which is determined on the basis the preference characteristic and the evaluated values. According to the color conversion lookup table generation method configured in this manner, it is possible to generate a color conversion lookup table which outputs a combination of ink amounts which is matched with the preference of a user.

(2) In the color conversion lookup table generation method configured in the above-described manner, a process of, after execution of the process (ii), (v) outputting color patches each associated with a corresponding one of the plurality of ink amount set candidates is included, and the process (iii) may be a process of, by allowing a user to select one of the color patches, allowing the user to input a preference characteristic of the user. According to the color conversion lookup table generation method configured in this manner, it is possible to generate a color conversion lookup table which outputs a combination of ink amounts which is matched with the preference of a user, by allowing the user to select one of the color patches.

(3) In the color conversion lookup table generation method configured in the above-described manner, in the process (v), the color patches may be arranged on the basis of the evaluated values. According to the color conversion lookup table generation method configured in this manner, by allowing a user to select one of patches which are arranged on the basis of the evaluated values, the user can select it more easily. Further, according to the color conversion lookup table generation method configured in this manner, it is possible to generate a color conversion lookup table which outputs a combination of ink amounts which is matched with the preference of a user.

(4) According to a second aspect of the invention, a color conversion lookup table generation apparatus for generating a color conversion lookup table for use in converting a specific color specified in a color space into a set of ink amounts which is a combination of a plurality of ink amounts each associated with a corresponding one of inks usable by a printing apparatus is provided. This color conversion lookup table generation apparatus includes a parameter value acquisition section that acquires a set of parameter values which represents the specific color; an evaluated value acquisition section that acquires a plurality of ink value set candidates which corresponds to the set of parameter values, and evaluated values each associated with a result of printing based on a corresponding one of the plurality of ink amount set candidates; an input section that allows a user to input a preference characteristic of the user; and a generation section that applies a color conversion lookup table which converts the set of parameters into a set of ink amounts which is determined on the basis the preference characteristic and the evaluated values. According to the color conversion lookup table generation apparatus configured in this manner, it is possible to generate a color conversion lookup table which outputs a combination of ink amounts which is matched with the preference of a user.

(5) According to a third aspect of the invention, a program that causes a computer to generate a color conversion lookup table for use in converting a specific color specified in a color space into a set of ink amounts which is a combination of a plurality of ink amounts each associated with a corresponding one of inks usable by a printing apparatus is provided. This color conversion lookup table generation program causes the computer to realize the functions of (i) acquiring a set of parameter values which represents the specific color; (ii) acquiring a plurality of ink value set candidates which corresponds to the set of parameter values, and evaluated values each associated with a result of printing based on a corresponding one of the plurality of ink amount set candidates; (iii) allowing a user to input a preference characteristic of the user; and (iv) applying a color conversion lookup table which converts the set of parameters into a set of ink amounts which is determined on the basis the preference characteristic and the evaluated values. According to the color conversion lookup table generation program configured in this manner, it is possible to generate a color conversion lookup table which outputs a combination of ink amounts which is matched with the preference of a user.

In addition, it is possible to embody the invention in various forms, such as a manufacturing system for manufacturing a color conversion lookup table generation apparatus, a recording medium that records therein a computer program for realizing the function of the color conversion lookup table generation apparatus, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
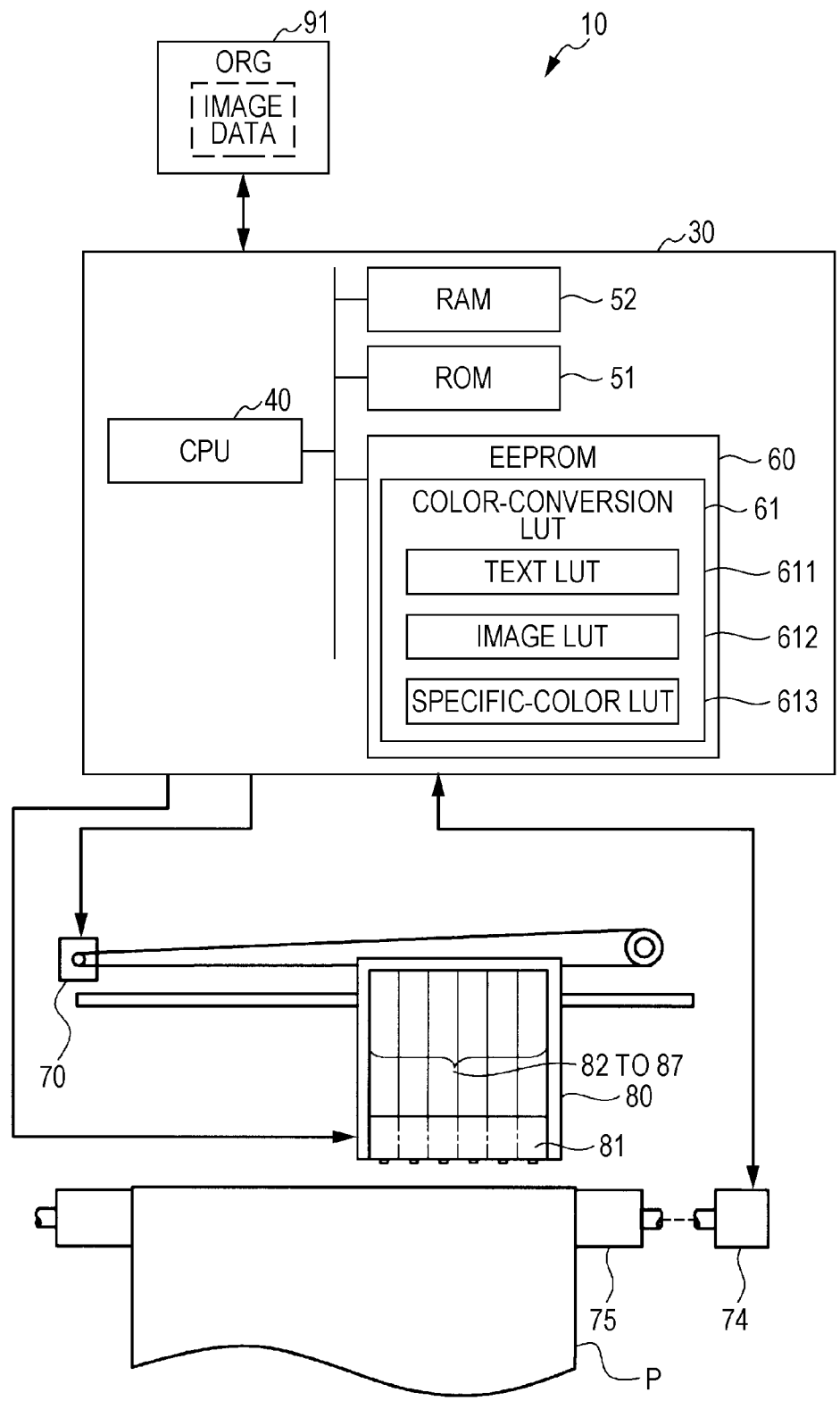
FIG. 1 is a diagram illustrating an outline of a configuration of a printing apparatus according to an embodiment of the invention.

Hereinafter, in order to make the behavior and the effect of the above-described aspects of the invention more obvious, an embodiment of the invention will be described in the following order.
A. Printing Apparatus
B. Color Conversion Lookup Table Generation Apparatus
C. Modification Examples A. Printing Apparatus FIG. 1 is a diagram illustrating an outline of a configuration of a printing apparatus as an embodiment of the invention. A printing apparatus 10 is a color ink jet printing apparatus, and includes a mechanism which transports a printing medium P by being driven by a paper feeding motor 74; a mechanism which reciprocates a carriage 80 in a direction parallel to a shaft of a platen 75 by being driven by a carriage motor 70; a mechanism which drives a printing head 81 mounted on the carriage 80 to discharge inks formed into dots; a control unit 30 which controls the paper feeding motor 74, the carriage motor 70, and the printing head 81; and an image data supply unit 91 which acquires image data from a computer or a recording medium (which are omitted from illustration) and supplies the acquired image data to the control unit 30.

The carriage 80 is provided thereon with ink cartridges 82 to 87 for color inks, each of which contains a corresponding one of a cyan ink, a magenta ink M, a yellow ink Y, a black ink K, a light cyan ink Lc, and a light magenta ink Lm. The printing head 81, which is mounted in a lower portion of the carriage 80, is provided with a plurality of nozzle rows each associated with a corresponding one the above color inks. When the ink cartridges 82 to 87 have been attached into the carriage 80 from an upper side of the carriage 80, the inks contained in the ink cartridges 82 to 87 become ready for being supplied to the printing head 81. In addition, in this patent description, the color inks include the black ink K.

The control unit 30 includes a CPU 40, a ROM 61, a RAM 52, and an EEPROM 60. The CPU 40 reads a control program, which is stored in the ROM 51 in advance, into the RAM 52, and executes the control program. Further, through this execution of the control program, the CPU 40 controls the reciprocation of the carriage 80 and the transportation of the printing medium P, as well as the discharge of the inks onto the printing medium P by driving the printing head 81.

Further, a color conversion lookup table 61 is stored in the EEPROM 60. This color conversion lookup table (hereinafter, also referred to as a "color-conversion LUT 61") is a table which converts each of color value sets defined in an aggregate of image data ORG, which has been supplied from the image data supply section 91 and has an RGB format, into a set consisting of ink amounts each representing a ink amount of a color ink contained in a corresponding one of the ink cartridges 82 to 87.

The color-conversion LUT 61 includes a text LUT 611, an image LUT 612, and a specific-color LUT 613. This specific-color LUT 613 is generated by a color-conversion LUT generation apparatus described below.

Figure 2:
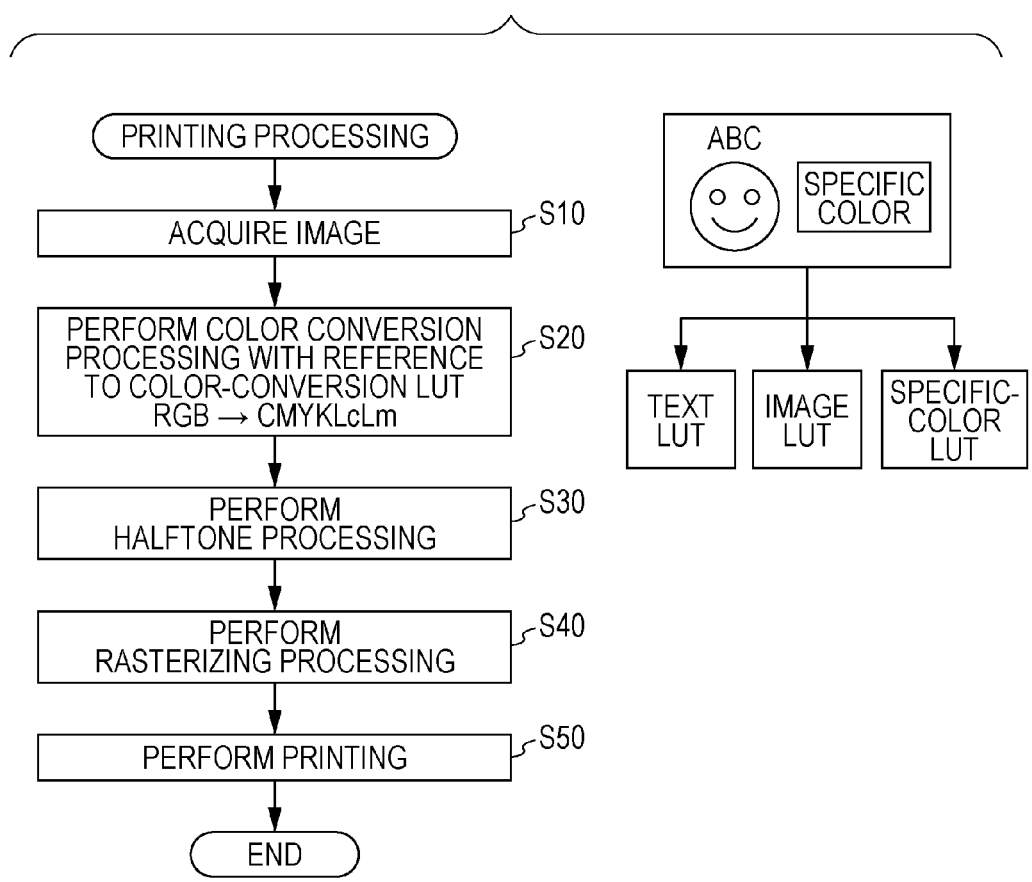
FIG. 2 is a flowchart illustrating printing processing performed by a printing apparatus, according to an embodiment of the invention.

FIG. 2 is a flowchart illustrating printing processing performed by the above-described printing apparatus. In FIG. 2, in an area to the right of boxes indicating processes of steps 10 and 20, a schematic diagram which makes it easy to understand the flowchart is illustrated. When a user instructs execution of printing processing, the CPU 40 acquires the aggregate of image data ORG including pieces of image data each having an attribute, from the image data supplying section 91 (step S10). In this embodiment, this attribute corresponds to one of three kinds of attributes, that is, a text attribute, an image attribute, and a specific-color attribute. In addition, the aggregate of image data ORG includes not only pieces of image data each having the image attribute, but also pieces of image data each having the text attribute and pieces of image data each having the specific-color attribute.

When having acquired the aggregate of image data ORG, the CPU 40 convers each of the color value sets defined in the aggregate of image data ORG into a corresponding one of the sets of ink amounts by referring to the color-conversion LUT 61, that is, any one of the text LUT 611, the image LUT 612, and the specific-color LUT 613, which is stored in the EEPROM 60 and which has been selected in accordance with an attribute of a piece of image data having the color value set targeted for the conversion. That is, for a portion corresponding to the text attribute, the text LUT 611 is referred to; for a portion corresponding to the image attribute, the text LUT 612 is referred to; and for a portion corresponding to the specific-color attribute, the text LUT 613 is referred to.

After the completion of the color conversion processing for converting into the sets of ink amounts in accordance with the color-conversion LUT 61, the CPU 40 performs halftone processing on an aggregate of image data resulting from the conversion into the sets of ink amounts (step S30). As a method for the halftone processing, specifically, an ordered dither method, an error diffusion method, a density pattern method, or the like, can be employed.

Next, the CPU 40 performs rasterization processing for rearranging pieces of image data constituting the aggregate of image data ORG (step S40). After the completion of the rasterization processing, the CPU 40 performs printing by driving the carriage motor 70 and the paper feeding more 74, as well as driving the printing head 81 to discharge the color inks on the basis of the pieces of rasterized image data (step S50).

B. Color Conversion Lookup Table Generation Apparatus

B1. Configuration of Apparatus

Figure 3:
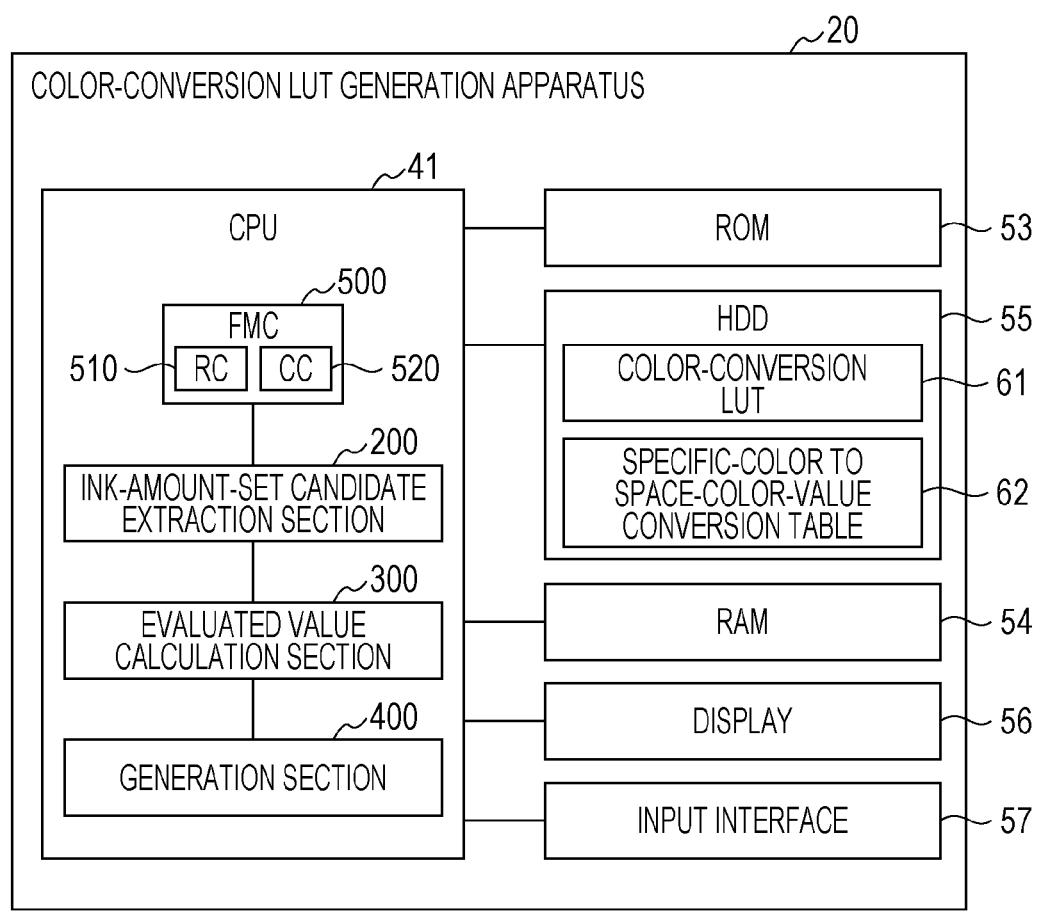
FIG. 3 is a diagram illustrating an outline of a color-conversion LUT generation apparatus for generating a color-conversion LUT shown in FIG. 1.

FIG. 3 is a diagram of an outline of a configuration of a color-conversion LUT generation apparatus 20 for generating the specific-color LUT 613 of the color-conversion LUT 61 shown in FIG. 1. The color-conversion LUT generation apparatus 20 is configured as a computer including a CPU 41, a ROM 53, a RAM 54, a HDD 55, a display 56, an input interface 57 provided with a mouse device, a keyboard, and the like. In this embodiment, the color-conversion LUT generation apparatus 20 is communicably connected to the printing apparatus 10.

The CPU 41 reads a program stored in the ROM 53 or the HDD 55 into the RAM 54, and execute the program. Further, through this execution of the program, the CPU 41 realizes functions of an ink-amount-set candidate extraction section (ink-amount-set candidate acquisition section) 200, a forward model converter 500, an evaluated value calculation section (evaluated value acquisition section) 300, a generation section 400, and the like. The HDD 55 stores therein, in addition to the color-conversion LUT 61 generated by the color-conversion LUT generation apparatus 20, a specific-color to color-space-value conversion table 62, which is a table containing specific color names and color space values, each of the specific color names being associated a color having a corresponding one of the color space values.

Figure 4:
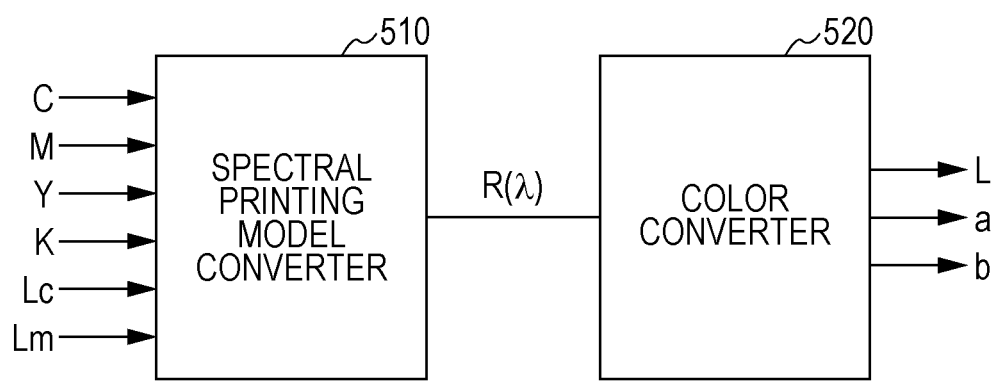
FIG. 4 is a diagram illustrating an outline of a configuration of a forward model converter according to an embodiment of the invention.

FIG. 4 is a schematic diagram illustrating the forward model converter 500. The forward model converter 500 has a function of converting a set of ink amounts into an "L*" value, an "a*" value, and a "b*" value within a CIELAB color space (hereinafter, these will be collectively referred to as just a "Lab value" or a "color space value"), and includes a spectral printing model converter 510 and a color converter 520.

The spectral printing model converter 510 converts a set of ink values each represented by a corresponding one of CMYKLcLm values into a spectral reflectance $R(\lambda)$. This spectral reflectance $R(\lambda)$ represents a colorimetric value of a color patch formed by inks defined by the set of ink values.

The color converter 520 calculates a Lab value from a spectral reflectance $R(\lambda)$ having been output by the spectral printing model converter 510. In this case, the color converter 520 calculates the Lab value on the basis of preset parameters, such as a type of a light source (for example, a standard light source D65), and a type of printing paper (for example, glossy paper). That is, the use of the forward model converter 500 makes it possible to, when a set of ink values has been input thereto, uniquely acquire a Lab value corresponding to the set of ink values. The configurations and functions of the spectral printing model converter 510 and the color converter 520 are disclosed in, for example, JP-T-2007-511175 and JP-A-2008-263579.

The ink-amount-set candidate extraction section 200 (refer to FIG. 3) has a function of extracting, for each of colorimetric value sets contained in the color-conversion LUT 61, a plurality of candidates for a corresponding set of ink values to be stored in the color-conversion LUT 61 (hereinafter, each of the candidates will be referred to as an "ink amount set candidate").

The evaluated value calculation section 300 has a function of calculating evaluated values each relating to a result of printing using a corresponding one of the acquired ink amount set candidates.

The generation section 400 has a function of generating a color-conversion LUT for converting each of color space values into a corresponding one of sets of ink values having been determined on the basis of the evaluated values calculated by the evaluated value calculation section 300 and the preference characteristic of a user.

B2. Process Flow of Generation of Color Conversion Lookup Table

Figure 5:
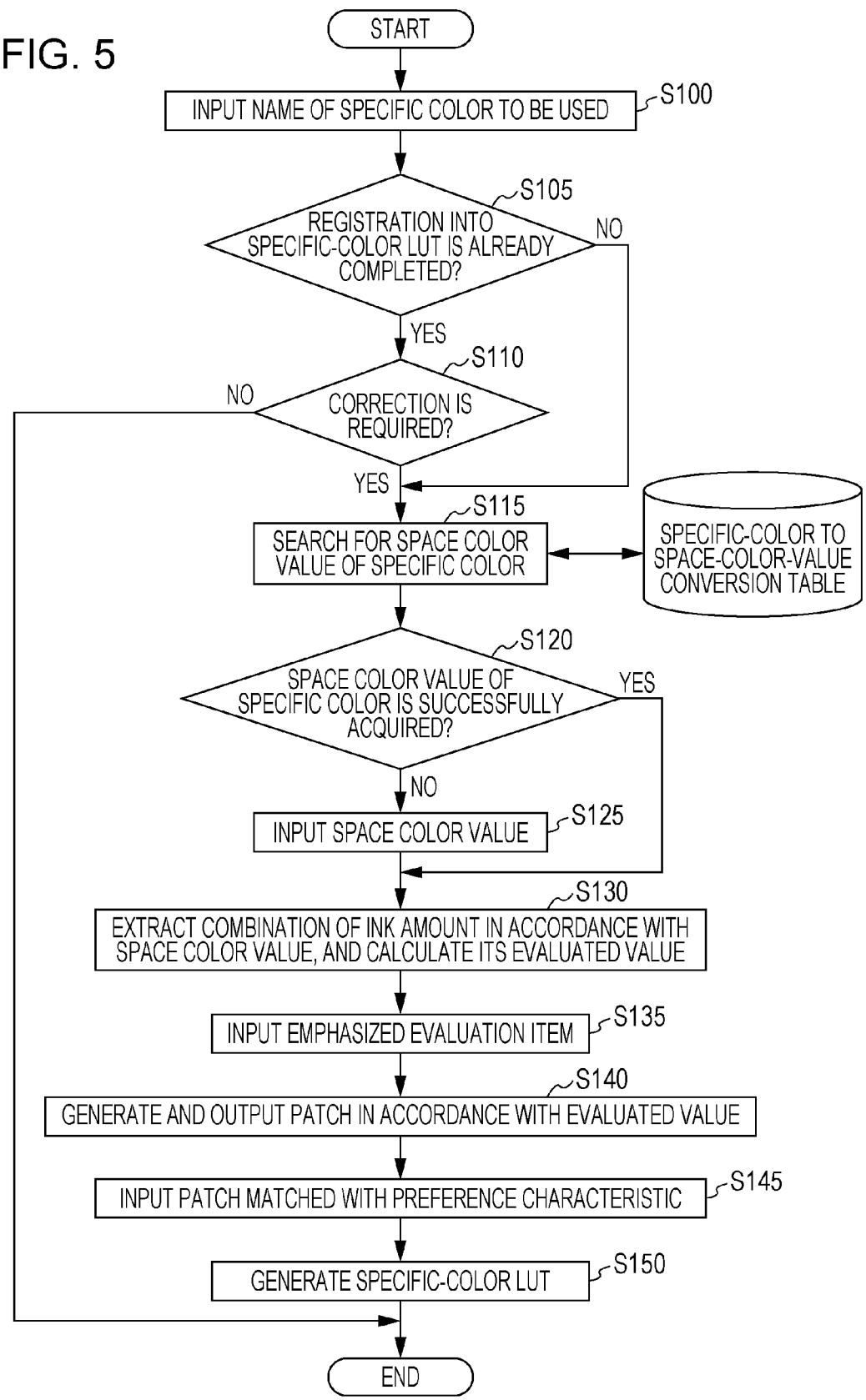
FIG. 5 is a flowchart illustrating processes of generating a color-conversion LUT, which are performed by a color-conversion LUT generation apparatus according to an embodiment of the invention.

FIG. 5 is a flowchart of processing for generating a color-conversion LUT performed by the color-conversion LUT generation apparatus 20. According to this flowchart, it is possible to generate a color-conversion LUT which outputs a combination of ink amounts which is matched with the preference of a user.

First, in step S100, the CPU 41 allows a user to input a name of a special ink which the user desires to use. In this embodiment, a specific color means a color other than cyan (C), magenta (M), yellow (Y), and black (K). In this embodiment, it is supposed that "green" is selected, as a specific color, by the user.

In step S105, the CPU 41 determines whether or not a specific-color LUT for use in converting the specific color having been input by the user is registered in the HDD. In the case where such a specific-color LUT is already registered in the HDD 55 (step S10: YES), the CPU 41 displays an inquiry for inquiring whether or not any correction on the specific-color LUT stored in the HDD 55 is desired, and causes the user to input a reply thereto via the input interface 57. In the case where a reply for notifying that any correction on the conversion table is not desired has been input (step S110: NO), this process flow is terminated.

Meanwhile, in the case where any specific-color LUT for use in converting the specific color having been input by the user is not registered in the HDD 55 (step S105: NO), or in the case where a correction on the specific-color LUT is desired (step S110: YES), the CPU 41 searches for a color space value of the specific color by using the specific-color to color-space-value conversion table 62 stored in the HDD 55 (step S115).

In the case where any color space value of the specific color cannot be acquired in the processing in step S115 for searching for a color space value of the target specific color (step S120: NO), the CPU 41 allows the user to input a color space value of the specific color which the user desires to use. Through this process, the input interface 57 has acquired a color space value representing the target specific color. In addition, a color-difference meter may be used as one of components of the input interface 57, and the CPU 41 may allow the user to perform colorimetry on a color chart by using this color-difference meter.

In the case where a color space value of the target specific color has been acquired through the processing for searching for a color value of a specific color (step S120: YES), or in the case where the user has input a color space value of the target specific color (S125), the CPU 41 causes the ink-amount-set candidate extraction section 200 to extract ink amount set candidates, and causes the evaluated value calculation section 300 to calculate evaluated values each associated with a corresponding one of the ink amount set candidates (step S130).

In this embodiment, as evaluation items, "continuity", "solidness", "granularity", "light fastness", and "usage" are employed. The evaluated value calculation section 300 calculates, for each of the ink amount set candidates, an evaluated value in each of these evaluation items. A method for calculating an evaluated value of a set of ink values is disclosed in, for example, JP-A-2007-516663 and JP-A-2008-230047. Further, the method for calculating an evaluated value of a set of ink values encompasses a method for acquiring an evaluated value by referring to a lookup table for use in acquisition of an evaluated value from a set of ink values. In addition, a different set of evaluation items may be used as a substitution for the above set of evaluation items.

Figure 6:
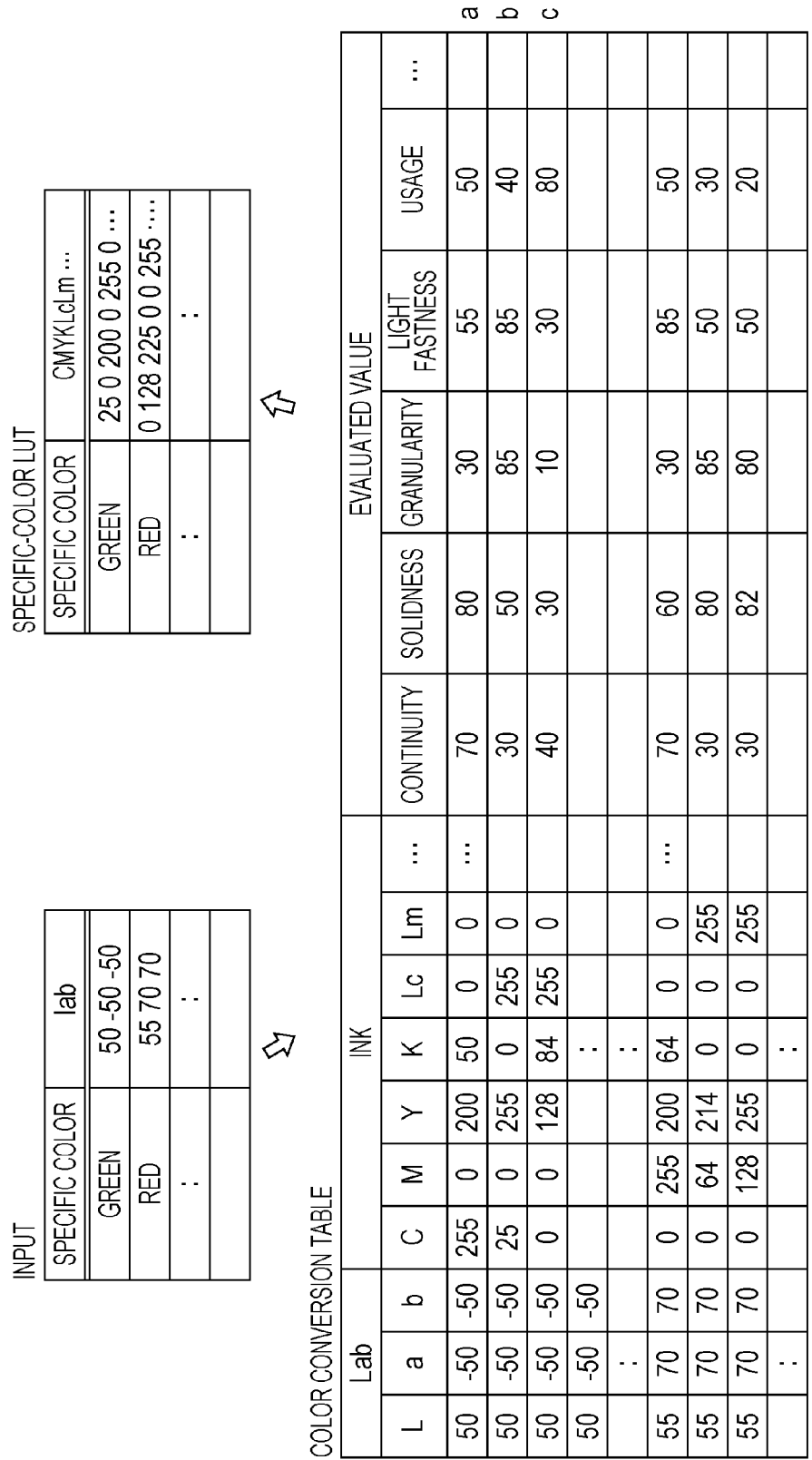
FIG. 6 is a diagram that describes a process flow from an input of a specific color until a determination of a specific color conversion table, according to an embodiment of the invention.

FIG. 6 is a diagram that describes a process flow from an input of a specific color until the completion of generation of a specific-color LUT.

In an upper-left table in FIG. 6, color space values having been input in step S115 or step S125 are listed. FIG. 6 shows that "green" and "red" have been input as specific colors.

In a lower table in FIG. 6, a plurality of ink amount value candidates, which corresponds to each of color space values (Lab values), are listed, and for each of the plurality of ink amount value candidates, evaluated values each associated with a corresponding one of the evaluation items are listed.

In this embodiment, an evaluated value of each of the evaluation items has a meaning described below. The "continuity" means a degree of continuity with a set of ink amounts which is output by a different LUT, and has a value which increases as a distance with the set of ink amounts which is output by the different LUT decreases. The "solidness" means a degree of smallness of the number of inks used in printing, and has a value which increases as the number of inks decreases. The "granularity" means a degree of a random granular texture due to a variation of the density of each of inks, and has a value which increases as the variation of the density of each of inks decreases. The "light fastness" means a degree of a difference between light fastness under a condition where an amount of light is large and light fastness under a condition where an amount of light is small, and has a value which increases as the difference degreases. The "usage" means a degree of ink usage, and has a value which increases as the ink usage decreases.

After the completion of the extraction of the ink amount set candidates and the calculation of the estimated values (step S130 (refer to FIG. 5)), the CPU 41 allows the user to input at least one of the evaluation items which is emphasized by the user, via the input interface 57 (step S135). Specifically, the CPU 41 indicates a list of the evaluation items (continuity, solidness, granularity, light fastness, and usage) on the display 56, and allows the user to input at least one of the evaluation items which is highly emphasized by the user, via the input interface 57. Any input of at least one of the evaluation items is sufficient, and when allowing the user to input at least two of the evaluation items, the CPU 41 may cause the user to input priority order thereof. In this embodiment, it is supposed that the user has input three of the evaluation items, that is, "solidness", "granularity", and "light fastness", in priority order in accordance with this description order.

After the input of the three evaluation items emphasized by the user (step S135), the CPU 41 generates color patches each associated with a corresponding one of the ink amount set candidates, and causes the printing apparatus 10 to perform printing of the color patches and, simultaneously therewith, output the color patches on the display 56 (step S140). In addition, the color patches may be output only from any one of the printing apparatus 10 and the display 56.

Figure 7:
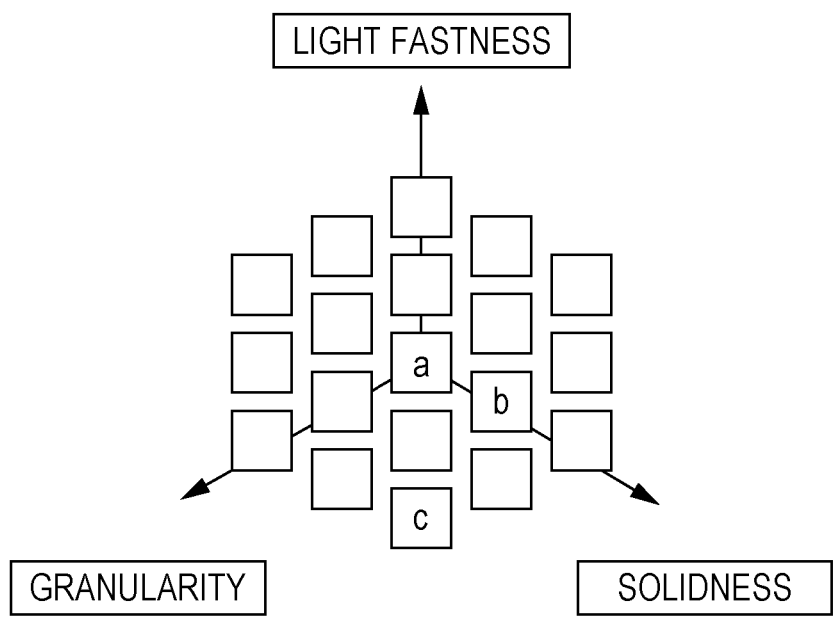
FIG. 7 is a schematic diagram illustrating color patches printed by a printing apparatus, according to a printing apparatus according to an embodiment of the invention.

FIG. 7 illustrates a schematic diagram of the color patches having been printed by the printing apparatus 10. In FIG. 7, the color patches are arranged on the bases of the evaluated values. In FIG. 7, the color patches are arranged on the basis of their evaluated values each associated with a corresponding one of the evaluation items having been selected by the user (i.e., "solidness", "granularity", and "light fastness"). Further, in FIG. 7, the larger an evaluated value of a color patch, which is calculated on the basis of the evaluated values of the evaluation items emphasized by the user is, the color path is located closer to the center.

In an portion to the right of the color conversion table arranged in a lower portion of FIG. 6, the names "a", "b", and "c" of three ink amount set candidates "a", "b", and "c" are appended in order from above, and further, in FIG. 7, each of these names is indicated within a box-shaped color path of a corresponding one of the three ink amount set candidates. That is, a color patch corresponding to the ink amount set candidate "a", which, as shown in FIG. 6, has a larger evaluated value than any other one of the three ink amount set candidates, is located at the center, as shown in FIG. 7. Meanwhile, a color patch corresponding to the ink amount set candidate "b", which is, as shown in FIG. 6, inferior in the solidness, but is superior in the light fastness, to the ink amount set candidate "a", is located at a position, shown in FIG. 7, at which a degree of the solidness is inferior to that at the position of the color patch corresponding to the ink amount set candidate "a", but a degree of the light fastness is superior to that at the position of the color patch corresponding to the ink amount set candidate "a". Further, a color patch corresponding to the ink amount set candidate "c", which is, as shown in FIG. 6, inferior to the ink amount set candidate "a" in the solidness, the granularity, and the light fastness, is located at a position, shown in FIG. 7, at which a degree of the solidness, a degree of the granularity, and a degree of the light fastness are largely inferior to those at the position of the color patch corresponding to the ink amount set candidate "a". This method of arranging the color patches on the basis of the evaluated values makes it easy for a user to make a determination.

After the color patches have been output in accordance with their evaluated values (step S140 (refer to FIG. 5)), the CPU 41 allows the user to input color patches matched with the preference characteristic of the user via the input interface 57 (step S145). That is, the CPU 41 allows the user to input the preference characteristic of the user via the input interface 57.

Thereafter, the CPU causes the generation section 400 to generate a color-conversion LUT for converting each of color space values into a corresponding one of sets of ink amounts, each associated with a corresponding one of the patches having been selected by the user (step S150).

An upper-right table of FIG. 6 is a table indicating a specific-color LUT for converting each of the color space values into a corresponding one of the ink amount set candidates, each associated with a corresponding one of the color patches having been selected by the user. In this embodiment, for the specific color "green", the color patch having been selected by the user is a color patch corresponding to the ink amount set candidate "b".

Simultaneously with the completion of the above process, the generation of the color conversion lookup table has been completed. In such a way as described above, it is possible to generate a lookup table which outputs a combination of ink amounts which is matched with the preference of a user.

In addition, "step S115 and step S120" in this embodiment correspond to the "process (i)" in "SUMMARY" described above. Similarly, "step S130" corresponds to the "process (ii)"; "step S145" corresponds to the "process (iii)"; "step S150" corresponds to the "process (iv)"; and "step S140" corresponds to the "process (v)". The "input interface 57" corresponds to the "acquisition section" and the "input section", and the "ink-amount-set candidate extraction section 200" and the "evaluation value calculation section 300" correspond to the "acquisition section". Further, the "color space value" corresponds to the "parameter value".

C. Modification Examples

C1. Modification Example 1

In this embodiment, as an equipment independent color system, the CIE-L*a*b* color system is employed, but a different appropriate equipment independent color system, such as a CIE-XYZ color system or a CIE-L*u*v* color system, can be employed. In this regard, however, from a viewpoint of realization of a smooth reproduction of colors, it is preferable to employ an equipment independent color system in an equal color space, such as the CIE-L*a*b* color system or the CIE-L*u*v* color system.

C2. Modification Example 2

In this patent description, the term "ink" is not used as a term having a meaning limited to a liquid ink, which is used in an ink jet printer, an offset printing, or the like, but is used as a term having a broader meaning involving a toner used in a laser printer. As a different term having such a broader meaning of the term "ink", a term "color material", a term "coloring material", or a term "coloring agent" can be employed.

C3. Modification Example 3

In the aforementioned embodiment, a method and an apparatus for generating a set of color conversion correspondence information, such as a lookup table, is described, but the invention can be applied to a printing apparatus manufacturing system including an incorporating portion for incorporating a set of color conversion correspondence information, which has been generated through such a method or an apparatus, into a printing apparatus. Further, a color conversion correspondence information generation apparatus for generating such a set of color conversion correspondence information may be included in this printing apparatus manufacturing system, or may be included in a different system or apparatus. In addition, the incorporating portion of this printing apparatus manufacturing system can be realized as an installer (an install program) for a printer driver.

C4. Modification Example 4

In the aforementioned embodiment, a Lab value corresponding to a sets of ink amounts is acquired by using the forward model converter 500, but, as a substitution for the method using the forward model converter 500, a method, in which a correspondence table containing ink amount set candidates each associated with a corresponding one of Lab values may be generated in advance, and ink amount set candidates may be selected from among the ink amount set candidates contained in the correspondence table, may be employed.

C5. Modification Example 5

In the aforementioned embodiment, in the carriage 80 included in the printing apparatus 10, the ink cartridges 82 to 87 which are used for color inks, and each of which contains a corresponding one of, for example, a cyan ink C, a magenta ink M, a yellow ink Y, a black ink K, light cyan ink Lc, and a light magenta ink Lm, are mounted, but a set of color inks to be mounted in the carriage 80 is not limited to such a set of these inks. For example, a method of mounting a set of color inks, such as a cyan ink C, a magenta ink M, a yellow ink Y, and a black ink K, in the carriage 80 is sufficient for printing apparatus 10. In addition to these inks, a red ink, a green ink, a blue ink, and/or the like may be included in the set of color inks. In this case, the color-conversion LUT generation apparatus 20 generates the color-conversion LUT 61 by determining optimum sets of ink values regarding such a set of color inks mounted in the carriage 80.

C6. Modification Example 6

The printing apparatus 10 is an ink jet printing apparatus, but, as a substitution for this ink jet printing apparatus, a laser printer or an offset printing apparatus, which performs printing by causing color toner to be adhered onto a printing medium, can be employed.

C7. Modification Example 7

In the aforementioned embodiment, the printing apparatus 10 and the color-conversion LUT generation apparatus 20 are configured such that they are separated from each other, but the printing apparatus 10 may incorporate the function of the color-conversion LUT generation apparatus 20. That is, the printing apparatus 10 may be configured so as to generate the color-conversion LUT 61. Further, a printing system including a computer and a printing apparatus may be regarded as a comprehensive printing apparatus, and this computer may be configured so as to generate a color-conversion LUT 61, and perform color conversion processing by using this color-conversion LUT 61. In this case, the computer becomes capable of further performing halftone processing and rasterization processing, as well as performing control so as to cause the printing apparatus to perform printing.

C8. Modification Example 8

In the aforementioned embodiment, the color-conversion LUT 61 is stored in the EEPROM 60, but the color-conversion LUT 61 may be stored in a different storage device, such as a ROM, a RAM, or a HDD.

C9. Modification Example 9

In the aforementioned embodiment, the generation of the specific-color LUT is described, but the invention is not limited to this generation of the specific-color LUT. The invention may be applied to the generation of the image LUT and/or the text LUT. That is, the invention can be applied to the generation of the LUT.

C 10. Modification Example 10

In the aforementioned embodiment, an LUT which converts each of color space values into a corresponding one of ink value set candidates each associated with a corresponding one of color patches having been selected by a user is generated. But the invention is not limited to this method. That is, an LUT which converts each of color space values into a corresponding one of ink value set candidates each having a larger evaluated value regarding evaluation items which are selected by a user in step S135 than any other ink value set candidate for the each of color space values may be generated. That is, the process of allowing a user to input a preference characteristic of the user may be made a process of allowing a user to input evaluation items selected by the user.

The invention is not limited to the aforementioned embodiment and modification examples, and can be applied to various configurations within a scope not departing the gist of the invention. For example, the technical features which are included in the aforementioned embodiment and modification examples and which correspond to the technical features included in the individual configurations of the invention, having been described in "SUMMARY", can be replaced by others and/or combined with one another as needed. Further, some of the technical features may be deleted when needed, provided that they are not described as essential ones in this patent description.

The entire disclosure of Japanese Patent Application No. 2014-015349, filed Jan. 30, 2014 is expressly incorporated by reference herein.

What is claimed is:

1. A color conversion lookup table generation method for generating a color conversion lookup table for use in converting a specific color specified in a color space into a set of ink amounts which is a combination of a plurality of ink amounts each associated with a corresponding one of inks usable by a printing apparatus, the color conversion lookup table generation method comprising the processes of:
   (i) acquiring a set of parameter values which represents the specific color, the set of parameter values including a space color value for the specific color;
   (ii) acquiring a plurality of ink value set candidates which corresponds to the set of parameter values, and evaluated values each associated with a result of printing based on a corresponding one of the plurality of ink amount set candidates;
   (iii) allowing a user to input a preference characteristic of the user, wherein a color conversion lookup table is generated that includes the specific color based on the preference characteristic; and
   (iv) applying the color conversion lookup table which converts the set of parameters into a set of ink amounts which is determined on the basis the preference characteristic and the evaluated values.

2. The color conversion lookup table generation method according to claim 1, further comprising a process of, after execution of the process (ii), (v) outputting color patches each associated with a corresponding one of the plurality of ink amount set candidates, wherein the process (iii) is a process of, by allowing a user to select one of the color patches, allowing the user to input a preference characteristic of the user.

3. The color conversion lookup table generation method according to claim 2, wherein, in the process (v), the color patches are arranged on the basis of the evaluated values.

4. A color conversion lookup table generation apparatus for generating a color conversion lookup table for use in converting a specific color specified in a color space into a set of ink amounts which is a combination of a plurality of ink amounts each associated with a corresponding one of inks usable by a printing apparatus, the color conversion lookup table generation apparatus comprising:
   a parameter value acquisition section that acquires a set of parameter values which represents the specific color, the set of parameter values including a space color value for the specific value;
   an evaluated value acquisition section that acquires a plurality of ink value set candidates which corresponds to the set of parameter values, and evaluated values each associated with a result of printing based on a corresponding one of the plurality of ink amount set candidates;
   an input section that allows a user to input a preference characteristic of the user, wherein a color conversion lookup table is generated that includes the specific color based on the preference characteristic; and
   a generation section that applies the color conversion lookup table which converts the set of parameters into a set of ink amounts which is determined on the basis the preference characteristic and the evaluated values.

5. A computer readable medium having stored thereon a non-transitory program that causes a computer to generate a color conversion lookup table for use in converting a specific color specified in a color space into a set of ink amounts which is a combination of a plurality of ink amounts each associated with a corresponding one of inks usable by a printing apparatus, the program causes the computer to realize the functions of:
   (i) acquiring a set of parameter values which represents the specific color, the set of parameter values including a space color value for the specific value;
   (ii) acquiring a plurality of ink value set candidates which corresponds to the set of parameter values, and evaluated values each associated with a result of printing based on a corresponding one of the plurality of ink amount set candidates;
   (iii) allowing a user to input a preference characteristic of the user, wherein a color conversion lookup table is generated that includes the specific color based on the preference characteristic; and
   (iv) applying the color conversion lookup table which converts the set of parameters into a set of ink amounts which is determined on the basis the preference characteristic and the evaluated values.

* * * * *